United States Patent [19]
Boos et al.

[11] Patent Number: 4,713,731

[45] Date of Patent: Dec. 15, 1987

[54] DOUBLE LAYER CAPACITOR

[75] Inventors: Donald L. Boos, Garfield Heights; Allan V. Marse, Independence, both of Ohio

[73] Assignee: Standard Oil Company, Cleveland, Ohio

[21] Appl. No.: 907,543

[22] Filed: Sep. 15, 1986

Related U.S. Application Data

[63] Continuation of Ser. No. 665,256, Oct. 26, 1984, abandoned, which is a continuation-in-part of Ser. No. 374,139, May 3, 1982, abandoned.

[51] Int. Cl.$^4$ ............................................. H01G 9/04
[52] U.S. Cl. ...................................................... 361/433
[58] Field of Search ..................... 361/433 E, 433 M; 429/57, 199, 202

[56] References Cited

U.S. PATENT DOCUMENTS

| | | | |
|---|---|---|---|
| 2,481,204 | 9/1949 | De Long et al. | 429/202 |
| 2,616,940 | 11/1952 | Reid | 429/202 X |
| 3,051,768 | 8/1962 | Kujas | 136/24 |
| 3,652,902 | 3/1972 | Hart et al. | 361/433 |
| 3,700,975 | 10/1972 | Butherus et al. | 361/433 |
| 3,926,680 | 12/1975 | Bauer et al. | 429/202 |
| 4,248,946 | 2/1981 | Malachesky | 429/199 X |
| 4,251,568 | 2/1981 | Hart | 429/199 X |
| 4,267,242 | 5/1981 | Coetzer et al. | 429/199 X |
| 4,304,825 | 12/1981 | Basu | 429/199 X |
| 4,307,159 | 12/1981 | Hammond et al. | 429/199 X |
| 4,327,400 | 4/1982 | Muranaka et al. | 361/433 |
| 4,337,501 | 6/1982 | Mund et al. | 361/433 |
| 4,367,268 | 1/1983 | Behl | 429/199 X |
| 4,389,468 | 6/1983 | Bjorkman | 429/199 X |
| 4,394,713 | 7/1983 | Yoshida | 361/433 |

FOREIGN PATENT DOCUMENTS

| | | | |
|---|---|---|---|
| 61053 | 6/1978 | Japan | 361/433 |
| 894725 | 4/1962 | United Kingdom | 361/433 |

OTHER PUBLICATIONS

I.B.M. Technical Disclosure Bulletin vol. 14, No. 3, Aug. 1971, pp. 674–676.

*Primary Examiner*—Donald A. Griffin

[57] ABSTRACT

Improved electrical double layer capacitors having carbon electrodes include in the electrolyte a voltage regulating agent selected from the group of bromides, chlorides, fluorides and iodides.

15 Claims, No Drawings

DOUBLE LAYER CAPACITOR

This is a continuation of application Ser. No. 665,256 filed Oct. 26, 1984 now abandoned which, in turn, was a continuation-in-part of application Ser. No. 374,139 filed May 3, 1982 now abandoned.

BACKGROUND OF THE INVENTION

1. Field of the Invention

This invention relates to an improved electrical double layer capacitor. More particularly, this invention relates to a novel process for balancing the leakage current of individual cells when stacked in series in an electrical double layer capacitor.

2. Description of the Art

This invention has two advantages over the prior art. First, this invention provides a means for controlling the gas evolution when charging double layer capacitors. Second, it provides a means for balancing the voltage and leakage current of individual capacitor cells when charged in series.

The evolution of gas when charging a capacitor is a serious problem. In sealed cells, the gas evolution can cause rupture of the invididual cell cases while in vented cells, where the cells are enclosed within a closed system, gas evolution can cause rupture of the container or even produce explosive atmospheres of various gas mixtures within the container.

Variances in the leakage current of capacitor cells is a significant problem when stacking individual cells in series. It is necessary to stack individual cells in series to increase the total voltage output of a capacitor since every such capacitor cell has a fixed voltage rating. Moreover, since the same amount of current will flow through each cell when stacked in series, the overall voltage output of a capacitor composed of a plurality of individual cells should theoretically equal the sum of the separate voltage capabilities of the individual cells. Thus, in order to maximize the efficiency, capacity and voltage output of a capacitor, the voltage characteristics of each cell should match since a defective cell can limit the voltage output of the entire capacitor.

However, individual cells tend to become unbalanced when charged in series. Some cells have low leakage currents while other cells have high leakage currents. If current is continued until all the cells are charged, those with low leakage currents will overcharge experiencing gas evolving reactions while other cells are still below the decomposition voltage of the electrolyte. As an example of gas evolution in a cell, during the overcharge of an aqueous electrolytic cell, oxygen will be formed at the positive electrode while hydrogen is formed at the negative electrode.

Leakage current as used herein, is the continuous current that passes through a fully charged capacitor cell to maintain steady state voltage conditions. In other words, leakage current can be measured by the amount of current required to maintain a constant voltage in the cell after full charge is obtained.

Previously used techniques for controlling these problems have not proven entirely satisfactory. Typically, capacitors are protected from overcharge by limiting the extent of charge. For example, conventional capacitors are charged to a voltage significantly below their total capacity. Thus, even when the voltage across any single cell is significantly increased to compensate for a less efficient cell, the possibility of overcharge is greatly diminished. However, in order to accomplish this, the capacitor is conventionally charged to approximately only 50–60% of the amount that is theoretically possible calculated from the voltage ratings of the individual cells. For example, a capacitor having three unit cells theoretically capable of being charged to three volts (one volt per cell) is charged only to between 1.5 and 2 volts. It is clear that this technique is both economically and electrically inefficient since additional unit cells must be used to obtain a specific total voltage output.

SUMMARY OF THE INVENTION

The objects of this invention are to provide a novel mechanism for (a) controlling the gas evolution; and (b) balancing the voltage. It is found that the above objects can be attained together with increased capacity in double layer capacitors.

We have found that the addition of voltage regulating agents to the electrolyte will balance the voltage between individual cells and maintain the voltage below the decomposition potential of the electrolyte. By maintaining the voltage below the decomposition potential of the electrolyte or solvent, the electrolyte will not decompose evolving gases such as hydrogen or oxygen.

Moreover, the voltage regulating agent provides a mechanism for uniformly charging individual cells stacked in series by balancing the leakage current of the cells and allowing for the voltages to approach equality.

The voltage regulating agent also increases the capacity of double layer capacitors.

According to this invention, an improved double layer capacitor cell is provided comprising:
  (a) a positive electrode and a negative electrode wherein the electrodes are comprised of carbon which is substantially free of adsorbed gases, in admixture with an electrolyte and a voltage regulating agent selected from the group consisting of bromide, chloride, fluoride and iodide;
  (b) a porous ionically conductive separator between the electrodes; and
  (c) a first and a second ion-insulating connector impervious to the electrolyte wherein the first connector is electronically contacted to the positive electrode and the second connector is electronically contacted to the negative electrode.

Also included herein is a double layer capacitor comprising a plurality of cells.

DETAILED DESCRIPTION OF THE INVENTION

The capacitors to which the present invention is directed include those of the type disclosed in U.S. Pat. No. 3,536,963, hereby incorporated by reference. The capacitors disclosed therein comprise a pair of carbon paste electrodes, a separator and an ion insulating connector. The carbon paste electrodes may be manufactured by mixing finely divided carbon particles with an electrolyte to form a paste and then subsequently forming an electrode from the paste.

The carbon electrodes used according to the present invention are composed of carbon particles and an electrolyte held captive therein. According to the present invention, the electrolyte contains a voltage regulating agent. The carbon electrodes are carbon paste electrodes.

The carbon used to prepare the carbon electrode in the present invention is preferably a high surface area carbon such as obtained by processes which produce "active" carbon. "Activation" of the carbon is a process by which greatly improved adsorption properties and increased surface areas are imparted to a naturally occurring carbonaceous material. The active carbon, which is preferably utilized in the preparation of the carbon electrodes, has a surface area in the range of about 100 to about 2,000 $m^2/gm$, and preferably in the range of about 500 to about 1,500 $m^2/gm$, as measured by the Brunauer-Emmet-Teller method. The pores of the activated carbon material must be large enough to permit electrolyte penetration.

The desired surface area of carbon may be obtained by numerous activation methods known in the art. For example, any raw carbon-containing or carbonaceous material is carbonized or charred usually in the absence of air below 600° C. Typical types of carbon-containing material include but are not limited to heavy oils, waste liquors from paper mills, nut shells and the like.

The method used most extensively to increase the surface area of carbonized material is controlled oxidation by suitable oxidizing gases at elevated temperatures. Most of the present commercial processes involve steam or carbon dioxide activation between 800° C. an 1,000° C., or air oxidation between 300° C. and 600° C. Alternatively, gases such as chlorine, sulfur dioxide and phosphorus may also be used. Typically, the time required for activation varies from 30 minutes to 24 hours, depending on the oxidizing conditions and the quality of active carbon utilized. Inhibitors or accelerators can be mixed with the carbon to develop an increased activity. Other activation methods can be employed including but not limited to metallic chloride activation, electrochemical activation and dolomite activation.

It is believed that adsorbed gases from the activated carbon may be released during cycling and cause the cell to fail. Thus, depending on the carboneous material and activation technique utilized, it may be preferable to remove adsorbed gases from the activated carbon. One method used to accomplish this is a vacuum heat treatment. The temperature and pressure of the treatment can vary with temperatures above about 600° C. being preferred and above about 700° C. being more preferred. The vacuum pressure treatment is carried out below atmospheric pressure and typically ranges from about $10^{-3}$ to about $10^{-6}$ atmospheres. Other techniques for removing adsorbed gases known to those skilled in the art can be utilized.

In one method of preparing the carbon electrode, activated carbon, in the form of powder or fine particles, is mixed with an electrolyte to form a thick slurry. The use of coarse carbon particles should be avoided since the jagged feature of the coarse particles would penetrate the separator and establish an electrode-to-electrode contact between the opposing electrodes causing a short. Water or other diluents can be used to facilitate preparation of the slurry. After the slurry is formed and the carbon and the electrolyte are well dispersed, excess water or diluent can be extracted by any conventional means, such as vacuum or pressure filtration, leaving a viscous paste. The electrode may be formed from the paste by placing a batch of the paste under a ram and applying a predetermined pressure. Upon application of pressure, some liquid would generally exude from a paste.

The electrolytes used in the process of the present invention consist of any highly ionically conductive medium such as an aqueous solution of an acid, salt or a base. Examples of suitable aqueous electrolytes include but are not limited to ammonium chloride, sodium chloride, calcium chloride, potassium chloride, potassium carbonate, sulfuric acid, fluoroboric acid, sodium hydroxide, potassium hydroxide, trifluorosulfonic acid and the like. Preferred are the aqueous solutions of acids such as sulfuric acid and fluoroboric acid.

Non-aqueous electrolytes wherein water is not utilized as a solvent can also be used. Typical non-aqueous electrolytes are salts of organic and inorganic acids, ammonium and quaternary ammonium salts and the like, dissolved in appropriate solvents. Appropriate solvents include but are not limited to nitriles such as acetonitrile and propionitrile; sulfoxides such as dimethyl-, diethyl-, ethyl methyl and benzylmethyl sulfoxide; amides such as dimethyl-formamide; pyrrolidones such as N-methylpyrrolidone; and carbonates such as propylene carbonate.

The solvents utilized may also function as an electrolyte and as used herein are considered part of the electrolyte. Thus, the term electrolyte as used herein includes both the above described salts and the solvents. It should be noted that useful electrolytes must be capable of solubilizing the voltage regulating agent in both its oxidized and reduced form.

The electrolyte in the electrode structure serves four functions: (1) as a promoter of ion conductivity, (2) as a source of ions, (3) as a binder for the carbon particles, and (4) as a solubilizer of the voltage regulating agent. Sufficient electrolyte should be used to accommodate these functions although a separate binder can be used to perform the binding functions.

The pressure applied to form the electrode in a preferred embodiment is dependent on many variables such as dimension of the electrode, particle size of the carbon material, particular electrolyte used, etc. Generally, the molding pressure can vary to a maximum of about 100,000 psi. Preferably, the molding pressure will range from about 1,000 psi to about 80,000 psi and most preferably, from about 1500 psi to about 50,000 psi.

The ion-insulating connector can be any conducting material which is impervious to ionic conductivity and is typically carbon, copper, lead, aluminum, gold, silver, iron, nickel, tantalum or other conducting metals which are not affected by the electrochemical reaction, conducting polymers or non-conductive polymers filled with conducting material so as to make the polymer electrically conductive. Preferred are carbon or graphite loaded butyl rubbers or carbon filled polycarbonates. The ionic insulating connector is characterized by its electrical insulating property and its chemical inertness to the particular electrolyte employed at the potential impressed upon it. Its primary functions are as an electron current collector and an inter-cell ionic insulator. Typical ion-insulating connectors are more fully described in U.S. Pat. Nos. 3,656,027, 4,023,079 and 4,014,730.

Between the electrodes is a separator generally made of a highly porous material which functions as an electronic insulator between the electrodes while affording free and unobstructed movement to the ions in the electrolyte. The pores of the separator must be small enough to prevent electrode-to-electrode contact between the opposing electrodes, since such a condition would result in a short circuit and consequent rapid depletion of the charges accumulated on the electrode. The separator can also be a non-porous ion-conducting material including but not limited to ion exchange membranes such as synthetic resins containing sulfonic, carboxylic, phenol or substituted amino groups and the like. Generally, any conventional battery separator is suitable including but not limited to porous polyvinyl chloride, porous polyolefins, glass fiber filter paper, cellulose acetate, mixed esters of cellulose and fiberglass cloth. It is preferred to saturate the separator with electrolyte prior to incorporation into a cell. This can be accomplished by soaking the separator in the electrolyte.

We have found that the addition of a voltage regulating agent to the electrolyte of a cell will increase the cell leakage current. This becomes particularly important when the leakage current of one cell is different than the leakage current of another cell when charged in series. Since previously known cells with low leakage currents often reach higher voltages than cells with high leakage currents, the cells with the low leakage currents will overcharge and evolve gas. By increasing the leakage current of the cells, accomplished in the present invention by the addition of a voltage regulating agent, all of the cells will charge more uniformly.

According to this invention, a particular voltage regulating agent can be chosen which will activate at a determined voltage, the oxidation potential of the regulating agent, which is below the decomposition potential of the electrolyte and before the state in which the cells are fully charged. Once activated, the voltage regulating agent both increases the cell's leakage current and decreases the cell's ability to exceed the decomposition potential of the electrolyte. In other words, the voltage regulating agent acts as a moderator preventing the overcharging of a unit cell and the breakdown of the electrolyte which causes the gas evolution. Further, the voltage regulating agent has no detrimental effect at voltages below the specific agent's oxidation potential. By employing the voltage regulating agent in the electrolyte of each of the unit cells stacked in series, the opportunity for a single unit cell to overcharge, evolve gas and destroy the capacitor is significantly diminished.

The voltage regulating agent also increases the overall capacitance of the cells. It is believed that the energy storage of the voltage regulating agent's red/ox potential is recoverable when current is reversed or drawn from the cell. Thus, double layer capacitors can be prepared with increased capacitances by adding a voltage regulating agent to the electrolyte prior to making the carbon electrode.

The voltage regulating agents are generally ionic, capable of becoming electrically charged ions or radicals. They are characterized by their ability to undergo reduction/oxidation reactions and remain soluble in the electrolyte in both states. It is particularly important that the voltage regulating agent remain soluble in the electrolyte in both the oxidized and the reduced state and will neither gas nor plate on an electrode. Examples of preferred voltage regulating agents are the halide ions; bromide, chloride, fluoride and iodide, with bromide being most preferred. Preferably, the voltage regulating agents will have an oxidation potential of between about 0.6 volts and about 1.2 volts.

The voltage regulating agents can be added to the electrolyte in various forms known to those skilled in the art. For example, the halides can be added in the form of hydrogen, sodium, potassium or ammonium compounds. The voltage regulating agent can be added to the electrolyte in varying concentrations depending upon the specific electrolyte employed. Typically, the molar concentration of ions will range from about 0.01 to about 10 moles, preferably about 0.1 to about 3.0 and most preferably about 0.5 to about 1.5 moles of ion per liter of electrolyte.

SPECIFIC EMBODIMENTS

Example 1

Activated carbon type APL from Calgon Corporation was obtained having the following specifications:
Total Surface Area: 1,000–1,100 m$^2$/g
Through 325 Mesh—65–75%
Pore Volume Within Particle 0.9–1.22 cc/g
Apparent Density 0.41 g/cc
Real Density 2.10–2.35 g/cc
Moisture Content 2% Maximum
Iodine Value 900
Total Ash (maximum) 8.5%.

Approximately 300 grams of APL carbon was placed into a stainless steel container which was lined with graphoil and had a graphoil gasket. The stainless steel container was placed in a muffle furnace and connected to a vacuum system. The carbon was heated for 2 hours at 800° C. at a vacuum of 26–28 mm Hg°. The stainless steel container was then put into a dry box with an argon atmosphere for 30 minutes to remove all oxygen before opening the container.

The carbon was then removed from the container and an electrolyte mixture of $H_2SO_4$ 25% by weight and 1 molar HBr was slowly added to the carbon until the carbon was completely covered by the electrolyte. The carbon was allowed to soak in the electrolyte for approximately 10 days. The carbon was then removed to absorbent paper to remove some of the excess electrolyte so that the carbon/electrolyte mixture became a paste. The carbon was then placed in a compression fixture with the fixture placed into an hydraulic press and compressed to 10,000 psi to remove excess electrolyte. A carbon aggregate was obtained which was removed from the compression fixture and sifted through a U.S. sieve size 80 mesh (177 microns) screens. The carbon was kept in a tightly closed dry box at approximately 75% relative humidity.

2.6 grams of the carbon was carefully placed into a compression die. A plunger was placed into the die and twisted so as to evenly distribute the carbon throughout the die. The die assembly was then placed into a hydraulic press and compressed to 6,000 psi. The die was disassembled revealing a compressed carbon disk approximately 0.125 inch (3.18 mm) thick and 1.150 (29.21 mm) inches in diameter.

A gasket was stamped out of a sheet of non-conductive butyl rubber and cemented, using Pliobond industrial adhesive from the Goodyear Tire and Rubber Company, to a flat circular sheet of a conductive butyl rubber from the Industrial Rubber Company (Compound No. 13, Mold No. 1319/1051). The gasket was stamped out of a sheet of non-conductive butyl rubber also purchased from the Industrial Electronic Rubber Company (Compound No. L723-2, Mold 171) and had an internal diameter of 1.25 inches (31.75 mm) and an external diameter of 1.575 inches (40.01 mm). The circular sheet served the function of an electronic conductor and ionic insulator. It was stamped out of a butyl sheet having a thickness of about 0.008 inches (0.20 mm) and a diameter of about 1.153 inches (29.29 mm).

The carbon disk was placed into the cavity created by the gasket and the circular sheet of butyl rubber. A pair of such electrode assemblies were prepared. A porous polypropylene separator obtained in sheets from The Calgon Corporation was stamped in a circular sheet having a thickness of 0.001 inches (0.025 mm) and measuring about 1.275 inches (32.39 mm) in diameter. This separator serves the function of electronically insulating the opposed electrodes. The polypropylene circular sheet was interposed between a pair of the electrode assemblies and cemented with Pliobond industrial adhesive in order to form a cell. The cell was then placed under a ram and compressed slowly until 6,000 psi was achieved.

Five other cells were prepared using the procedure and apparatus of above and by placing electrical connections to the upper and lower platens, electronic variables could be determined. Each cell was placed on constant potential and charged to a desired voltage (ranging from 0.7–1.1 V) and then discharged at 100 m.a. constant current to 0.0 volts. The capacitance in coulombs/gram of active material was determined for each cell at various voltage levels as indicated in the Table I. The values shown in Table I are the average capacitance for six cells when each cell was charged to the specific voltage.

Example A

Six cells were prepared in accordance with the procedure and apparatus employed in Example 1. However, the electrolyte employed contained only 25% by weight $H_2SO_4$ and are provided for comparison. The results of these examples can also be found in Table I and are expressed as average values for six cells.

TABLE I

| Charge Voltage (Volts) | Capacitance (Coulombs/gm)* Example 1 | Example A |
| --- | --- | --- |
| 0.7 | 12.6 | 8.9 |
| 0.8 | 15.3 | 9.8 |
| 0.9 | 19.2 | 12.7 |
| 1.0 | 25.6 | 14.9 |
| 1.1 | 35.1 | 19.6 |

*All values are averages for 6 cells.

Example 2

Four additional cells were prepared in accordance with the procedure and apparatus employed in Example 1. The four cells were charged at constant potential to the cell voltages indicated in Table II. Leakage currents were than measured for each cell after 18 hours of charge at the constant potential shown. The results are found in Table II and again are in averages for four cells when each was charged to the potential shown.

Example B

Four additional cells were prepared using the procedure and apparatus of Example 1. However, these cells were prepared in accordance with Example A in that no HBr was employed and are also provided for comparison. These cells were then charged at a constant potential to the cell voltage indicated in Table II. Leakage currents were measured for each cell after 18 hours of charge at the constant potential shown. The results can be seen in Table II. Again, the results in Table II are the average for four cells when being charged to the potential shown.

TABLE II

| Charge Voltage | Leakage Current (ma)* Example 2 | Example B |
| --- | --- | --- |
| 0.7 | 4.8 | 4.6 |
| 0.8 | 4.8 | 4.8 |
| 0.9 | 4.9 | 4.4 |
| 1.0 | 6.0 | 4.5 |
| 1.1 | 6.5 | 4.6 |
| 1.2 | 7.0 | 4.8 |

*All values are averages for 4 cells.

As can be seen from Table I, the average capacitance of the six cells of Example 1, with a voltage regulating agent incorporated into the electrolyte, are increased as compared to the average capacitance of the six cells of Example A when charged from 0.7 to 1.1 volts.

The four cells of Example 2 exhibit increased leakage currents when the average values are compared to the average values of the four cells of Example B which do not have a voltage regulating agent incorporated into the electrolyte. It is important to note, as seen in Table II, that the increase in leakage current exhibited by the cells of Example 2 does not occur until approximately 1.0 volts is obtained. It is believed that as the potential difference across the cell during charge approaches 1 volt, bromide ion is being oxidized to bromine gas at the positive electrode. The bromine gas is then solubilized by the electrolyte and diffuses to the negative electrode where it is reduced to bromide ion. Once this bromine to bromide cycle has been established, the potential difference across the cell will not rise much above 1 volt providing the rate of bromine evolution does not exceed the rate of diffusion to and reduction at the negative electrode. Once this condition of equilibrium is obtained, the possibility for overcharge of the cell is significantly decreased. Thus, in a plurality of cells stacked in series where the individual cells have mismatched capacities, the cells can be charged in series without overcharge of a single cell. This prevents the excess current above that needed to charge the cell from causing dissociation of the electrolyte and prevents the accompanying gassing.

It is known that those cells in series having lower leakage currents than other cells in series will obtain a maximum charge of one volt sooner than those with higher leakage currents as long as the same amount of charge has passed through each cell. Hence, it is believed that by utilizing the process of the present invention, those cells charged in series will maintain a maximum charge of one volt via the bromine-bromide cycle until the other cells having the higher leakage currents obtain one volt at which time all of the cells will maintain a one volt maximum via the bromine-bromide cycle.

Example 3

Four cells were prepared using the procedure and apparatus of Example 1. Each cell was individually charged at constant potential to about 1.0 volt. Then each cell was separately discharged to a different depth of discharge simulating a mismatch in cell capacitance. Utilizing a constant potential power source of 4.0 volts, the four cells were charged in series. After 22.4 hours, the cell voltage were as reported in Table III.

TABLE III

| Cell | Initial | Voltage After 22.4 Hours of Charge |
| --- | --- | --- |
| 1 | 0.32 | 1.04 |

TABLE III-continued

| Cell | Initial | Voltage After 22.4 Hours of Charge |
|---|---|---|
| 2 | 0.66 | 1.02 |
| 3 | 0.72 | 0.98 |
| 4 | 0.0 | 0.98 |

Example C

Four more cells were prepared in accordance with the procedure and apparatus employed in Example 3. However, in these cells, the electrolyte contain no HBr and are provided for comparison. Using the same process as above, the results are found in Table IV.

TABLE IV

| Cell | Initial Voltage | Voltage After 22.4 Hours of Charge |
|---|---|---|
| 1 | 0.61 | 1.32 |
| 2 | 0.0 | 0.64 |
| 3 | 0.32 | 0.71 |
| 4 | 0.68 | 1.33 |

A comparison of the cells containing HBr, the voltage regulating agent, in the electrolyte (Example 3) and the cells not containing HBr in the electrolyte (Example C) show a distinct difference between the cells when charged in series. Since all the cells were charged in series and each cell had a different initial voltage, it could be expected that certain cells would obtain full charge more rapidly then others. However, the cells containing HBr in the electrolyte show a uniformity at approximately 1.0 volts while the cells containing no HBr in the electrolyte have non-uniform voltages with one cell exhibiting a voltage over 1.3 which resulted in gassing. Thus, by utilizing the process of the present invention, cells with various leakage currents can be charged in series to maximum capacity without overcharging individual cells, thereby eliminating gassing and the eventual rupture of capacitor cells.

Thus it should be apparent to those skilled in the art that the subject invention accomplishes the objects set forth above. It is to be understood that the subject invention is not to be limited by the examples set forth herein. These have been provided merely to demonstrate operability. The scope of this invention includes equivalent embodiments, modifications and variations that fall within the scope of the attached claims.

What is claimed is:

1. An improved double layer capacitor cell comprising:
    (a) a positive and a negative electrode both comprised of carbon in admixture with a liquid electrolyte having a voltage regulating ion selected from the group of bromide, chloride, fluoride and iodide in solution therein, the voltage regulating agent having a concentration ranging from about 0.01 to about 10 moles per liter of electrolyte;
    (b) a porous ionically conductive separator between said positive electrode and said negative electrode; and
    (c) a first and a second ion insulating connector impervious to the electrolyte wherein the first connector is electronically connected to said positive electrode and the second connector is electronically connected to said negative electrode.
2. The double layer capacitor cell of claim 1 wherein the surface area of the carbon electrode is in the range of 100–2,000 m$^2$/g.
3. A double layer capacitor cell of claim 1 wherein the surface area of the carbon is in the range of 500–1,500 m$^2$/g.
4. The double layer capacitor cell of claim 1 wherein the electrolyte comprises a salt dissolved in an organic solvent.
5. The double layer capacitor cell of claim 1 wherein the electrolyte is an aqueous solution of an acid and the voltage regulating ion is a bromide.
6. The double layer capacitor cell of claim 1 wherein the electrolyte is aqueous sulfuric acid and the voltage regulating ion is a bromide.
7. The capacitor cell of claim 1 wherein the voltage regulating agent is bromide.
8. An improved double layer capacitor cell comprising:
    (a) a positive and a negative electrode both comprised of carbon in admixture with a liquid electrolyte having a voltage regulating ion selected from the group of bromide, chloride, fluoride and iodide in solution therein, wherein the concentration of the voltage regulating agent ranges from about 0.1 to about 3.0 moles per liter of electrolyte;
    (b) a porous ionically conductive separator between said positive electrode and said negative electrode; and
    (c) a first and a second ion insulating connector impervious to the electrolyte wherein the first connector is electronically connected to said positive electrode and the second connector is electronically connected to said negative electrode.
9. An improved double layer capacitor cell comprising:
    (a) a positive and a negative electrode both comprised of carbon in admixture with a liquid electrolyte having a voltage regulating ion selected from the group of bromide, chloride, fluoride and iodide in solution therein, wherein the concentration of the voltage regulating agent ranges from about 0.5 to about 1.5 moles per liter of electrolyte;
    (b) a porous ionically conductive separator between said positive electrode and said negative electrode; and
    (c) a first and a second ion insulating connector impervious to the electrolyte wherein the first connector is electronically connected to said positive electrode and the second connector is electronically connected to said negative electrode.
10. An improved double layer capacitor cell comprising:
    (a) a positive and a negative electrode both comprised of carbon in admixture with a liquid electrolyte having a voltage regulating ion selected from the group of bromide, chloride, fluoride and iodide in solution therein, wherein the voltage regulating agent has an oxidation potential between about 0.6 volts and about 1.2 volts;
    (b) a porous ionically conductive separator between said positive electrode and said negative electrode; and
    (c) a first and a second ion insulating connector impervious to the electrolyte wherein the first connector is electronically connected to said positive electrode and the second connector is electronically connected to said negative electrode.
11. An improved double layer capacitor comprising a plurality of cells electronically connected, the cells each comprising:

(a) a positive and a negative electrode both comprised of activated carbon in admixture with a liquid electrolyte, said electrolyte having, as a minor constituent, a solubilized ion selected from the group of bromide, chloride, fluoride and iodide functioning as a voltage regulating agent, said voltage regulating agent having a concentration ranging from about 0.01 to about 10 moles per liter of electrolyte;

(b) a porous ionically conductive separator between said positive electrode and said negative electrode; and (c) a first and a second ion insulating connector impervious to the electrolyte wherein the first connector is electronically connected to said positive electrode and the second connector is electronically connected to said negative electrode.

12. A double layer capacitor comprising a housing, at least one pair of spaced carbon paste electrodes in the housing, the electrodes being self-supporting bodies compressed from a viscous paste of carbon particles, and a liquid electrolyte, said electrolyte containing, as a minor constituent, a solubilized bromide ion in amount sufficient to provide a concentration ranging from about 0.01 to about 10 moles per liter of electrolyte, an ionically conductive separator means between and in contact with the electrodes electronically separating the electrodes from each other, and a pair of ion insulating connectors impervious to the electrolyte and electronically connected to the electrodes.

13. A process for balancing the leakage current of individual cells stacked in series in a double layer capacitor, each cell having a positive and a negative electrode wherein said electrodes are comprised of active carbon substantially free of absorbed gases, an electrolyte, and first and second ion insulating connectors impervious to the electrolyte wherein the first connector is electronically contacted to the positive electrode and the second connector is electronically contacted to the negative electrode, the process comprising introducing into the electrolyte a voltage regulating agent selected from the group consisting of bromide, chloride, fluoride and iodide in a concentration ranging from about 0.01 to about 10 moles per liter of electrolyte.

14. An improved double layer capacitor cell for stacking in electronic contact with similar cells to provide capacitors having a predetermined capacitance value, said double layer capacitor cell comprising:

(a) a positive electrode and a negative electrode both comprised of activated carbon in admixture or permeated with a liquid electrolyte, said liquid electrolyte containing, as a minor constituent, a solubilized voltage regulating bromide ion provided by dissolving HBr in the electrolyte;

(b) a solid porous ionically conductive separator between the positive and the negative electrode; and (c) a first and a second ion-insulating electronically conductive connector impervious to the electrolyte wherein the first connector is in contact with and electronically connected to said positive electrode and the second connector is in contact with and electronically connected to said negative electrode.

15. An improved double layer capacitor cell comprising:

(a) a positive and a negative electrode bath comprised of carbon in admixture with a liquid electrolyte having a voltage regulating bromide ion provided in the electrolyte by the addition of HBr thereto;

(b) a porous ionically conductive separator between said positive electrode and said negative electrode; and (c) a first and a second ion insulating connector impervious to the electrolyte wherein the first connector is electronically connected to said positive electrode and the second connector is electronically connected to said negative electrode.

* * * * *